US012154451B1

(12) United States Patent
Brathwaite et al.

(10) Patent No.: US 12,154,451 B1
(45) Date of Patent: *Nov. 26, 2024

(54) PERSONAL NAVIGATION SYSTEM

(71) Applicant: Haley Brathwaite, Danville, CA (US)

(72) Inventors: Haley Brathwaite, Danville, CA (US); Amaranath Somalapuram, Bangalore (IN); Krishnaraj Bhat, Bangalore (IN); Ramanathan Venkataraman, Bangalore (IN); Prakash Murthy, Bangalore (IN)

(73) Assignee: Haley Brathwaite, Danville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,120

(22) Filed: May 23, 2023

Related U.S. Application Data

(63) Continuation of application No. 16/484,699, filed as application No. PCT/US2018/018904 on Feb. 21, 2018, now Pat. No. 11,705,018.

(60) Provisional application No. 62/461,636, filed on Feb. 21, 2017.

(51) Int. Cl.
| G09B 21/00 | (2006.01) |
| G06F 3/01 | (2006.01) |
| G08B 6/00 | (2006.01) |
| H04W 4/20 | (2018.01) |
| H04W 4/80 | (2018.01) |

(52) U.S. Cl.
CPC .......... G09B 21/007 (2013.01); G06F 3/016 (2013.01); G08B 6/00 (2013.01); H04W 4/20 (2013.01); H04W 4/80 (2018.02)

(58) Field of Classification Search
CPC ......... G09B 21/007; G08B 5/00; H04W 4/80; H04W 4/20; G06F 3/016
USPC .......................................... 701/428
See application file for complete search history.

(56) References Cited

U.S. PATENT DOCUMENTS

| 9,508,269 B2 | 11/2016 | Slamka |
| 9,572,233 B1 | 2/2017 | Moore |
| 9,770,382 B1 | 9/2017 | Ellis |
| 10,024,667 B2 | 7/2018 | Moore et al. |
| 10,656,720 B1* | 5/2020 | Holz ....................... G06F 3/017 |

(Continued)

FOREIGN PATENT DOCUMENTS

| JP | S59116025 U | 8/1984 |
| JP | 2001-202590 A | 7/2001 |

(Continued)

OTHER PUBLICATIONS

International Search Report and Written Opinion issued in connection with corresponding PCT Application No. PCT/US2018/018904 dated Apr. 19, 2018.

(Continued)

*Primary Examiner* — Jack K Wang
(74) *Attorney, Agent, or Firm* — Maschoff Brennan

(57) ABSTRACT

A navigation system includes an intelligent guidance module for identifying, using machine learning, one or more frequently travelled paths, by a user of the navigation system; and detecting one or more objects on the one or more frequently travelled paths. The navigation system (Continued)

further includes a generation module for generating auditory-haptic information to navigate the user through one of the one or more frequently travelled paths, based at least on the detected one or more objects.

20 Claims, 5 Drawing Sheets

(56) References Cited

U.S. PATENT DOCUMENTS

| | | | | |
|---|---|---|---|---|
| 11,705,018 | B2* | 7/2023 | Brathwaite | G06F 3/016 |
| | | | | 434/112 |
| 2006/0028544 | A1* | 2/2006 | Tseng | A61H 3/068 |
| | | | | 348/62 |
| 2006/0129308 | A1 | 6/2006 | Kates | |
| 2008/0170118 | A1 | 7/2008 | Albertson et al. | |
| 2009/0032590 | A1* | 2/2009 | Hopkins | A61H 3/061 |
| | | | | 235/385 |
| 2013/0220392 | A1* | 8/2013 | Gassert | A61H 3/068 |
| | | | | 135/66 |
| 2014/0067265 | A1 | 3/2014 | Maston | |
| 2015/0058319 | A1 | 2/2015 | Miyajima | |
| 2016/0078278 | A1* | 3/2016 | Moore | G02B 27/017 |
| | | | | 345/8 |
| 2017/0166164 | A1* | 6/2017 | Sticherling | B60R 25/2045 |
| 2018/0356233 | A1* | 12/2018 | Baqain | H04M 1/72412 |
| 2020/0367618 | A1* | 11/2020 | Daly | A45B 3/04 |

FOREIGN PATENT DOCUMENTS

| | | |
|---|---|---|
| JP | 2005-139761 A | 6/2005 |
| JP | 2008-523388 A | 7/2008 |
| JP | 2008-302006 A | 12/2008 |
| JP | 2011-215106 A | 10/2011 |
| JP | 2012-088253 A | 5/2012 |
| JP | 2014-113410 A | 6/2014 |
| JP | 2015-043148 A | 3/2015 |
| JP | 2015-087320 A | 5/2015 |
| JP | 2017-529521 A | 10/2017 |
| WO | 2010113239 A1 | 10/2010 |

OTHER PUBLICATIONS

Office Action issued in connection with corresponding Japanese Patent Application No. 2019-540335 dated Jul. 20, 2021.

Office Action issued in connection with corresponding Japanese Patent Application No. 2019-540335 dated Feb. 3, 2022.

Office Action issued in connection with corresponding Japanese Patent Application No. 2022-160702 dated Nov. 18, 2022.

* cited by examiner

PERSONAL NAVIGATION SYSTEM

RELATED APPLICATION(S)

This application claims the benefit of co-pending U.S. patent application Ser. No. 16/484,699, filed on Aug. 8, 2019, which claims the benefit of International application no. PCT/US2018/018904, filed on Feb. 21, 2018, which claims the benefit of U.S. provisional patent application No. 62/461,636, filed on Feb. 21, 2017. These applications are hereby incorporated by reference as if fully set forth herein.

TECHNICAL FIELD

This invention relates to a personal navigation system and methods.

BACKGROUND ART

Visually-impaired or blind persons face lot of challenges in handling day-to-day activities due to lack of their visual sensing ability. The current de facto standard for helping visually-impaired persons navigate is the ubiquitous walking stick (a traditional "white cane"). The walking stick, however, is a passive device that is very limited in the way it provides feedback to a visually-impaired person regarding obstacles in their path-feedback that is limited to impact—and surface-related tactile and (somewhat) auditory channels. Challenges associated with these feedback methods include a limited understanding of the associated obstacles in the blind person's path, which might create some difficulty in making a navigation decision. A person who is walking while accessing various kinds of information visually, not limited to a visually impaired person, may encounter various dangers while walking.

SUMMARY OF INVENTION

One of the aspects of this invention is a navigation system including: an intelligent guidance module configured to: identify, using machine learning, one or more frequently travelled paths, by a user of the navigation system; and detect one or more objects on the one or more frequently travelled paths. The navigation system further includes a generation module configured to generate auditory-haptic information to navigate the user through one of the one or more frequently travelled paths, based at least on the detected one or more objects. This system empowers a person including a visually-impaired person to sense the surroundings to find a safe route and the content (information, message, alarm, etc.) is perceived by auditory sense and/or haptic (tactile) sense rather than visual sense conveying the detected result, thus enhancing their mobility.

Another aspect of this invention is a smart walking stick including: one or more sensors configured to detect a moving object approaching the smart walking stick from one or more directions around the smart walking stick; and a generation module configured to generate auditory-haptic content to navigate around the moving object based at least on the detection of the moving object.

Still another aspect of this invention is a smart walking stick including: one or more sensors configured to detect a presence of one or more objects around a user of the smart walking stick; and a generation module. The generation module is configured to: generate 3-dimensional (3D) depth profile information around the user, based at least on a measured distance of each of the one or more objects from the user; determine a safety route involving minimal interference from the one or more objects, based at least on the 3D depth profile information; and generate audio-haptic content to indicate the determined safety route.

BRIEF DESCRIPTION OF DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
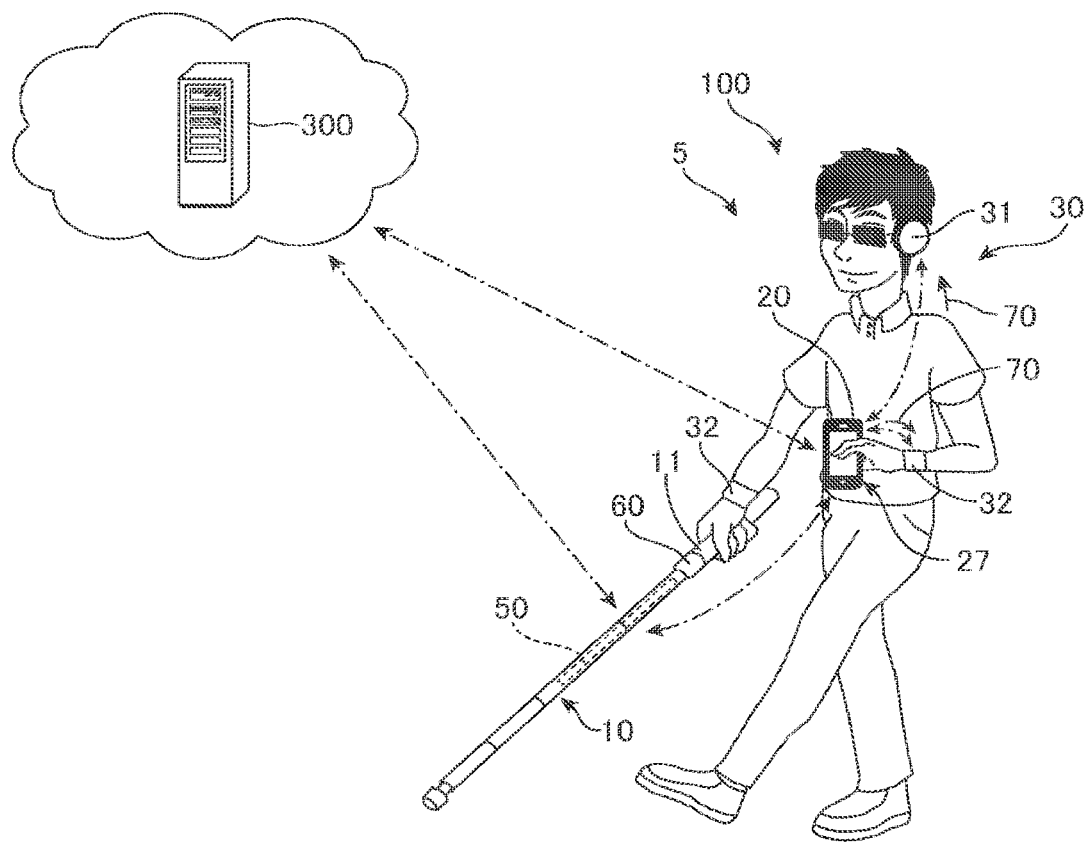
FIG. 1 is a high-level diagram depicting operation of one embodiment of a personal navigation system in accordance with the invention.

Modern navigational systems and sensors have been developed to precisely identify a person's location, determine an optimal route from one location to another, and provide directions for the person to successfully navigate the route. Such navigational systems and sensors may also make drivers, pedestrians, and bicyclists aware of their surrounding environment and automatically detect obstacles, traffic, and conditions along the intended route. In some cases, sensing technology and navigation systems may assist pedestrians or other users by identifying a shortest or most easily navigable route, or by enabling the user to select a desired route based on other criteria.

Despite these recent technological advances, blind or visually-impaired persons still typically rely on a traditional "white cane" to detect and/or avoid obstacles in their path. The usefulness of a white cane is very limited, however, since it is only capable of providing impact- or surface-related tactile feedback from objects encountered in the user's immediate path. Indeed, the cane must actually touch the obstacle for the user to be alerted to it. Thus, even with the assistance of a white cane, blind or visually-impaired persons must work from a very limited understanding of the state of the path they are attempting to navigate, and must make navigation decisions based on highly incomplete information regarding obstacles in and conditions of such path.

That is, visually-impaired persons are typically very limited in their understanding of their surrounding environment, even with the aid of an assistive device such as a white cane. This limited understanding, combined with the largely unpredictable nature of most modern environments, makes it almost impossible for a visually-impaired person to navigate a public place both confidently and safely. Indeed, even in a highly familiar environment, a visually-impaired person runs a rather high risk that objects may have been moved during an interim time period, that inclement weather may have impacted the safety of a well-known travel route, or that other pedestrians or animals may impede the person's intended walking path or trajectory. Systems and methods in accordance with the present invention address these issues and, more particularly, facilitate a visually-impaired user's awareness of safety hazards associated with an intended walking path so that the user may avoid them, or may safely and efficiently navigate the path despite them.

Accordingly, what are needed are a personal navigation system or devices adapted to provide comprehensive information to a visually-impaired person regarding a desired navigation route, including features of the surrounding environment that may be hazardous (hazard factor, risk factor, factor of danger) to visually-impaired persons as, for example, they traverse the route. In one of embodiments, such devices would augment the functionality of a traditional white cane by providing step-by-step navigational cues and real-time feedback to alert a visually-impaired person to the existence of standing water, ice, objects, and other obstacles and hazards. Such devices may also promote safe navigation by enabling visually-impaired persons to select their most desirable navigation route taking into account their unique physical requirements.

FIG. 1 illustrates a system that includes a personal navigation system 100 for visually-impaired users, or simply personal navigation system (device) 100 referred to as a Smart Assistant system, may be provided to assist a visually-impaired person 5, according to an embodiment herein. The personal navigation system 100 may comprise one or more devices to assist a visually-impaired person (user) 5. For example, a personal navigation system 100 may include a smart walking stick 10, an application installed on a smart device 20 such as a cellular phone 27, and communication devices 30 such as wearable devices including earphones (earpieces, recovers, headphones) 31, wristband 32 with vibrator and other equipment and apparatus to ensure a content (information, messages, alarms, advising) 70 is communicated to the person 5 by using auditory sense and/or tactile (haptic) sense, or a combination thereof, or a integration of all or some of the devices thereof. As will be shown hereinafter, the disclosed technology may, in certain embodiments, be distributed across the smart walking stick 10, the smart device 20, and the wearable communication devices 30 with each providing different features and functions.

In this system 100, the smart walking stick 10 includes a sensing suite 50 that is configured to find a safety route for the person 5 by searching obstacles, hazards and other things that may hinder the person's safe, and a lighting apparatus 60 that is positioned near a handle 11 of stick 10. The smart walking stick 10 is one of examples of the assisting tools for visually-impaired persons 5. The system 100 may include other assistant tool such as wheelchairs, walking aids, safety vests and the like that can be held or wearable by a person 5 and the sensing suite 50 can be integrated or incorporated therein. The smart device 20 and/or the wearable devices 30 may include the sensing suite 50 or a part of the sensing suite 50 and/or the lighting apparatus 60. The elements configuring the smart assistant system 100 such as the smart walking stick 10, the smart device 20 and the wearable devices 30 may be connected by wire or by way of an appropriate wireless communication technology, such as a Wi-Fi connection, cellular data connection, Bluetooth® or the like.

As shown in FIG. 1, the smart walking stick 10, the smart device 20 and the communication devices 30 may work together to assist a visually-impaired person 5 in understanding and navigating their surrounding environment. As an example, as will be explained in more detail in FIG. 2, the sensing suite 50 having various sensors may be integrated into the smart walking stick 10 to gather information about the user's environment. These sensors may be incorporated into the smart walking stick 10 at appropriate locations for sensing the desired conditions. For example, some types of sensors, such as water sensors, may be positioned at or near an end of the smart walking stick 10, whereas other types of sensors may be located at or near a handle of the smart walking stick 10, depending on the condition being detected.

When a condition is sensed by the smart walking stick 10, the smart walking stick 10 may directly notify the visually-impaired person 5 of the condition through various mechanisms such as sounds, vibrations, or other types of tactile feedback. Alternatively, the smart walking stick 10 may relay the condition or raw data to the smart device 20, which may in turn notify the visually-impaired person 5 through sounds, vibrations, or the like.

In certain embodiments, processing-intensive tasks such as video processing may be performed by the smart device 20, which may have additional processing resources compared to the smart walking stick 10. In other embodiments, the smart walking stick 10 and smart device 20 may rely on remote servers 300 to perform processing-intensive tasks. Thus, in certain embodiments, the smart walking stick 10 and/or smart device 20 may maintain connectivity with a remote server, such as a cloud server 300.

Figure 2:
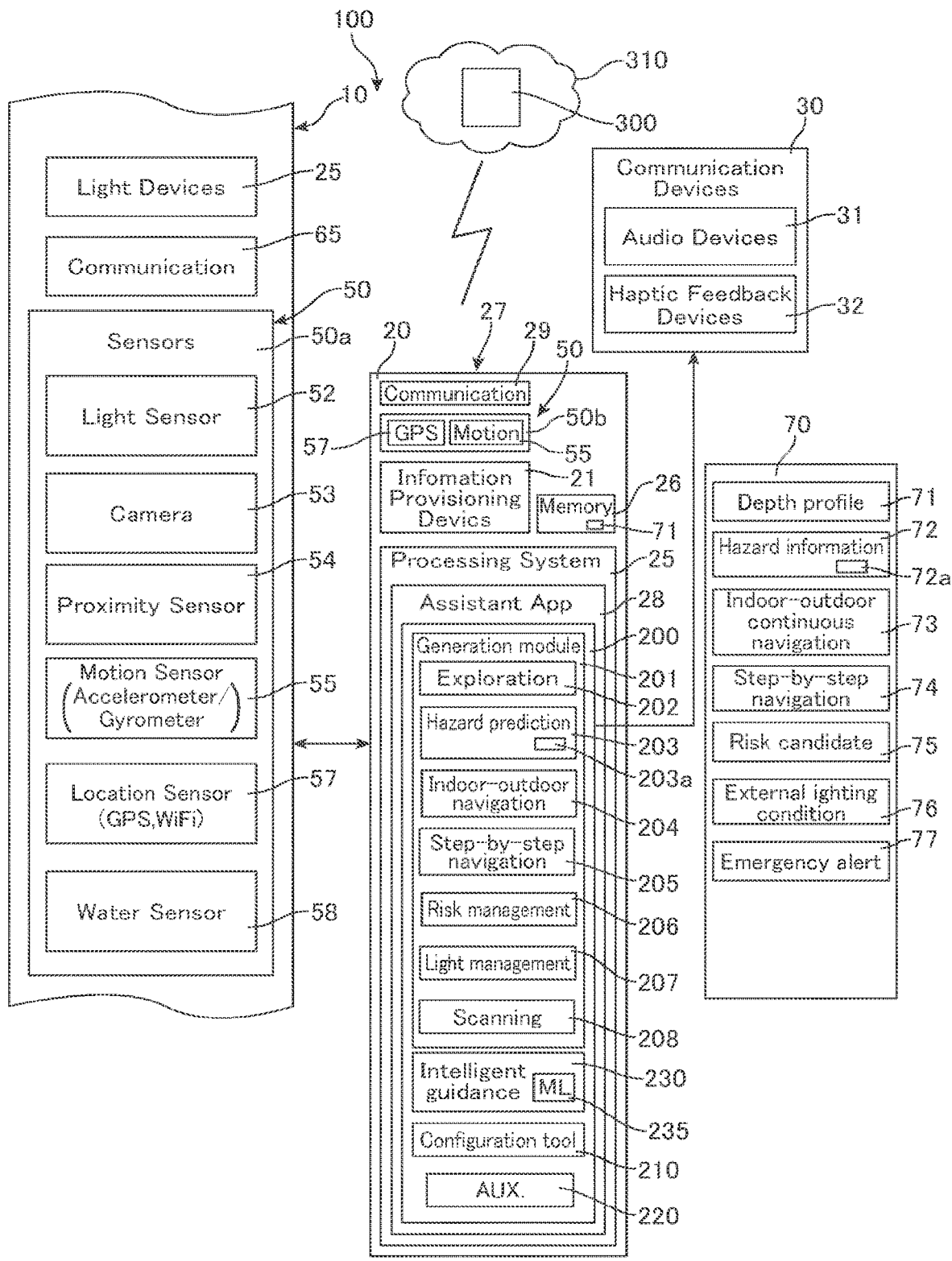
FIG. 2 is a schematic of one embodiment of a personal navigation system in accordance with the invention.

FIG. 2 illustrates a block diagram of the system 100. The system 100 includes the smart walking stick 10, the smart device 20 and the communication devices 30. Typical communication devices 30 are wearable devices that may include output devices of different types, for example, audio devices 31, and haptic feedback devices 32. Typical audio devices are earphones 31 and typical haptic feedback devices are vibrators 32 or push/pull devices to be attached to a part of body of the user 5, for example as wristbands, wristwatch computers, wrist communicator and the like. The wearable communication devices 30 are configured to communicate or transfer the auditory-haptic content 70 generated by the smart device 20 to the person 5. The auditory-haptic content 70 is not perceived or recognized visually but perceived or recognized by auditory sense and/or haptic sense and indicates the found safety route. That is, the auditory-haptic content 70 does not include information, content and materials expressed by images, views, photos, pictures and the like to be understood or recognized using visual (vision sense) but includes content such as information, messages, instructions and signals with verbal, tactile and/or haptic feedback that are understood or recognized by auditory sense only, haptic sense only or auditory and haptic senses.

The smart walking stick 10 includes the lighting device 60, a first sensor subsystem 50a that is a part of the sensing suite 50 and communication means 65 for communicating with the smart device 20. The sensor subsystem 50a is a sensor array that includes various sensors that may be integrated into or coupled to a body of the smart walking stick 10 to gather information with respect to the surrounding environment.

The smart device 20 includes information-provisioning devices 21 such as Braille-provisioning devices, or any other such feedback devices known to those in the art, a processing system 25 such as a microcontroller, a signal processor, a field-programmable gate array (FPGA), or the like, and a memory 26. Some implementations of the system 100 may use an embedded processing system such as Raspberry Pi. In certain embodiments, an assistant application 28, or application software running on the host processing system 25, may provide for functioning a set of modules 200 for implementing processes, logics or analytics of the system 100 while also performing other functions. The smart device 20 includes a second sensor subsystem 50b that is a part of sensing suite 50.

For example, the assistant application 28 may implement the set of modules 200 that includes a generation module 201 that, based on various sensed conditions by the sensors of the sensing suite 50, generates or creates an auditory-haptic content 70 including notifying or alerting a visually-impaired person 5 via one or more output devices provided as wearing communication devices 30. In some embodiments, the set of modules 200 may include an auxiliary module 220 for providing a user interface and offer connectivity to remote services provided by a cloud server 300, for example, such as remote video analytics and/or navigation. The cloud server 300 is connected via the Internet (cloud) 310, and the smart device 20 includes appropriate communication means 29 for communicating via the Internet 310, for example, Wi-Fi, wireless LAN, a cellular phone communication function and the like. The communication means 29 may include a function for communicating with the smart walking stick 10 and the communication devices 30 via Bluetooth® or other near field communications.

The set of modules 200 may include a configuration tool module (configuration tool) 210. The configuration tool 210 may be utilized to establish various thresholds or settings for the personal navigation system 100. The configuration tools 210 may, in certain embodiments, establish thresholds or settings that may be sent to and imported into the smart walking stick 10. These thresholds or settings, for example, may define sensed conditions that trigger an alert or notification to a visually-impaired person 5. For example, in one embodiment, the proximity sensors 54 may be associated with a threshold setting of 400 cm, such that an object sensed within 400 cm of the smart walking stick 10 may trigger an alert or notification to the visually-impaired person 5.

The sensing suite 50 may include various type of sensors that may be integrated into or coupled to the smart walking stick 10, the smart device 20 and/or the communication devices 30 to move with a body of user (person) 5 to gather information with respect to the surrounding environment of the user 5. The sensing suite 50 may include, for example, light sensors 52, camera sensors 53 such as stereo camera systems 53, proximity sensors 54 such as ultrasound (ultrasonic)-based ranging system, motion sensors 55 such as accelerometers and gyrometers, location sensors such as GPS receivers 57, water sensors 58, and the like. Information gathered from the various sensors in the sensing suite 50 may be processed by the set of modules 200 implemented on the processing system 25 and transferred to the wearable output devices 30 as the auditory-haptic content 70 to provide the visually-impaired person 5 with a more complete understanding of his surrounding environment and to alert the visually-impaired person 5 to impending obstacles and/or hazards.

Sensors of the sensing suite 50 may be positioned along the smart walking stick 10 at positions likely to generate accurate sensor readings. For example, water sensors 58 may be positioned near a distal end of the smart walking stick 10 while light sensors 52 and camera sensors 53 may be positioned near a handle 11 or proximal end of the smart walking stick 10. Other sensors, such as the proximity sensors 54, light sensors 52, motion sensors 55, location sensors 57, may likewise be located at appropriate positions along a length of the smart walking stick 10.

Various sensors included in the sensing suite 50 may be evaluated for physical quantities detected or measured by the respective sensors and may function as a sensor for determining a specific situation from a combination of physical quantities detected or measured by a plurality of sensors.

Proximity sensor 54 that may include ultrasonic sensors (sonar systems), radar systems and lidar systems (laser scanner systems), and/or camera sensors 53 may function as a sensor (sensing facility) for detecting (searching, exploring) special presence of an object (obstacle) in front of or around the smart walking stick 10. The generation module 201 may include an exploration unit 202 that is configured to generate the auditory-haptic content 70 including a depth profile information 71 in front of the smart walking stick 10 and/or around the person 5. Camera or stereo camera system 53 may be configured to provide depth or distance measurements using stereoscopic vision image processing techniques. The exploration unit 202 may include depth sensing of surrounding objects to create the depth profile information 71. The visually-impaired person 5 can turn the smart walking stick 10 to a desirable point and get the depth profile information 71 as a feedback of depth of objects in that direction. The sensors 54 and/or 53 can measure the distance of objects pointed by the smart walking stick 10 and the person 5 can get the content 70 that indicates the depth using, for example, different sound levels, pitches, or frequencies as feedback. Also, the content 70 may include a verbal feedback about the distance to an obstacle.

Information gathered by proximity sensors 54 such as the ultrasonic sensors may be received and processed by the exploration unit 202 in combination with information from the other type of sensors of proximity sensors 54, camera sensors 53, location sensors 57 such as GPS and other sensors to provide the content 70 including a more comprehensive understanding to the visually-impaired person 5 regarding the surrounding environment.

The depth profile information 71 may include a depth profile in front of the smart walking stick 10 that is an assistant tool for the person 5. The exploration unit 202 may include an obstacle detection analysis function based on inputs from sensors such as the ultrasonic ranging system of proximity sensors 54 or the camera 53. Obstacle detection is done based on the measured distance of the obstacle from the user 5. If the measured distance is less than a predetermined value N, then the exploration unit 202 turns on the buzzer using the wearable devices 30 via content 70 to provide an audible alert to the user 5 about the presence of an obstacle. If the measured distance is greater than the predetermined value N, then the exploration unit 202 turns off the buzzer. The value of N is a system-design parameter which, in some realizations, may have a value of 300 cm. Maximum and minimum possible resolved distances by the sensor may be 400 cm and 2 cm respectively. The user 5 of other system 100 may provide different range limits by using the configuration tool 210. Also, the buzzer state where the buzzer sounds may also depend on intermediate distance ranges in steps—for example, distance ranges of less than 100 cm, less than 200 cm and so on.

The depth profile 71 may include a 3D profile in front of the person 5 or a 3D profile around the person 5. The exploration unit 202 may generate the auditory-haptic content 70 including the 3D depth profile 71 around the person 5. By judging a safe route based on the three-dimensional profile, the exploration unit 202 can generate the auditory-haptic content 70 to indicate a safer route without interference with an obstacle, including not only the feet of the user 5 but also the entire body or overhead of the user 5. The depth profile 71 may be stored in the memory 26 to share with other functions and units.

Proximity sensor 54, camera sensors 53 and/or water sensors 58 may function as a sensor (sensing facility) for finding a hazard element on a route of the person 5. The generation module 201 may include a hazard prediction unit 203 that is configured to find and/or predict a hazard or potential hazard on an expected route of the person 5 based on the detection results of the sensors in the sensing suite 50 and generate the auditory-haptic content 70 including a hazard information 72 that indicates presence of the hazard element. Found hazard elements or potential hazard elements may be included in the 3D profile 71.

For example, water sensors 58 may be provided near an end of the smart walking stick 10 to detect standing or moving water, snow, or ice in the surrounding environment. The hazard prediction unit 203 may create the content 70 including information of a route that avoid the presence of water. The visually-impaired person 5 may be alerted to water detected by the water sensors 58 via the content 70, thereby enabling the visually-impaired person 5 to inform presence of water in the path and change course to avoid water, or to exercise an abundance of caution while navigating the path. During operation, water sensors 58 in the system 100 detects water content and if water is present, the system 100 turns on the vibrator 32 to issue haptic feedback to the user 5 as an alert, if water is not present, the system 100 turns the vibrator 32 off.

During operation, the sensors of sensing suite 50 may detect and/or measure various conditions of the surrounding environment, such as light levels, water, objects and obstacles, and surface variations such as steps, gravel, sand, and the like. Information generated by the sensors of sensing suite 50 may be communicated to the generation module 201 for processing based on configuration thresholds and settings. If the sensed levels fail to meet established thresholds, the generation module 201 may activate associated output to alert the visually-impaired person 5 to potential hazards using the wearable devices 30 via the content 70. By doing this, the system 100 may also inform the visually-impaired person 5 regarding the surrounding environment generally to provide the visually-impaired person 5 with a more complete understanding of his surroundings.

Location sensors 57 may include a sensor for position measurements in indoor and outdoor, such as GPS, Wi-Fi-based indoor positioning systems, cellular network navigation augmentation systems and the like. The outdoor/indoor GPS receiver and other location sensors 57 may be configured to provide position measurements that help in geolocation and navigation to a destination. The generation module 201 may include an indoor-outdoor navigation unit 204 that is configured to generate the auditory-haptic content 70 that includes continuous (seamless) navigation information 73 between indoor and outdoor for navigating the person to a desired destination. The indoor-outdoor navigation unit 204 may perform the navigation process that can be made seamless in well-defined environments, where a transition from an outdoor environment to an indoor environment with an a-priori registered Wi-Fi network can be such that the navigation method transitions seamlessly between GPS and indoor navigation systems, thus providing continuous navigation to the user. Indoor-outdoor environments to be supported by the navigation unit 204 may include in-vehicles, in-trains, on-board, in-water and the like, and using the system 100, the user may get in or out of a vehicle while still maintaining continuous navigation.

The indoor-outdoor navigation unit 204 may include a function of autonomously generating personal maps for navigating the user 5 between indoor and outdoor seamlessly. Generated maps may be registered on a Wi-Fi network and the personal navigation system 100 may automatically detect and differentiate between various indoor environments registered on the Wi-Fi network. In this manner, the system 100 may enable substantially continuous navigation as needed between vehicle navigation, navigating an outside environment such as a park, and navigating an indoor environment.

Motion sensors 55 and/or location sensors 57 of the sensing suite 50 may function as a sensor for finding step-by-step locations (foot-by-foot locations) of the person 5, and the generation module may include a step-by-step navigation unit 205 that is configured to generate the auditory-haptic content 70 that includes step-by-step navigation information 74. The sensors for finding step-by-step locations may be provided in the smart walking stick 10 and/or smart device 20. Accelerometers and gyrometers of the motion sensors 55 can sense motion of step-by-step of the person 5 based on changes of direction, speed, and acceleration of the smart walking stick 10 and/or the person 5 and can get waking speeds including stop and progressing, and walking directions of the person 5. The location sensors 57 can get the detail location and direction of the person 5 in feet.

The step-by-step navigation information 74 may include walking directions of user 5 to give step-by-step local assistance for the visually-impaired person 5 to navigate from point A to B. Step-by-step navigation 74 can provide precise foot-by-foot guidance up to, for example 2 ft accuracy in controlled environments like home, business park, mall etc. The step-by-step navigation information 74 may include step-by-step instructions to the visually-impaired person 5 to the direction and/or on the route selected step-by-step by the person 5, that may include a feedback of depth of objects (depth profile) 71, hazard or potential hazard information 72 and indoor-outdoor navigation information 73 on the direction and the route that may be changed or selected by the person 5 step-by-step.

Usually, during walking, the person 5 has multiple routes that can be selected and one of them can always be selected at any time, for example step-by-step. Camera sensors 53, proximity sensors 54, water sensors 58 and other sensors of the sensing suite 50 may be multiple directions type sensors that may function as a sensor for prefetching hazard elements on a plurality of expected routes of the person 5. The hazard prediction unit 203 may include a unit 203*a* that is configured to work in cooperation with the step-by-step navigation unit 205 to predict a presence of a hazard element on a route of the person 5 selected step-by-step among the prefetched hazard elements and to include such hazard information 72*a* in the content 70.

The step-by-step navigation unit 205 may generate a three-dimensional map for indoor environments frequently navigated by the visually-impaired person 5. Such a map may be generated using indoor positioning. Wi-Fi of location sensors 57, camera sensors 53, ultrasonic or lidar sensors of proximity sensors 54, and other such sensors known to those in the art. One or more of such maps can be utilized to provide precise foot-by-foot guidance to the visually-impaired person 5, within two feet of accuracy. This may enable a visually-impaired person 5 to confidently navigate indoor environments such as home, business, mall, and the like.

Camera sensors 53, proximity sensors 54, and location sensors 57 such as GPS may function as a sensor for prefetching risk factors or risk candidate factors for the person 5 on a plurality of expected routes of the person 5. The risk candidate factors may include stairs, steps, crosswalks, traffic signals and the like that are common to exist on the routes of the person 5 but can be risks or dangerous if the person 5 does not know that existence in advance.

The generation module 201 may include a risk management unit 206 that is configured to, working with the step-by-step navigation unit 205, to generate the auditory-haptic content 70 that includes a presence of risk candidate factor 75 on a route of the person 5 selectable step-by-step among the prefetched risk candidate factors. Camera sensors or stereo camera system 53 can capture image and/or video data associated with the surrounding environment and the risk management unit 206 can judge the risk candidate factors using image processing functions. Based on the location of the person 5 acquired by the location sensors 57, the risk management unit 206 can perceive the risk candidate factors around the person 5.

Light sensors 52, such as light-dependent resistors (LDRs), may be coupled to the smart walking stick 10 or other devices of the personal navigation system 100 to measure and/or monitor ambient light levels in the surrounding environment. The generation module 201 may include a light management unit 207 that is configured to generate the auditory-haptic content 70 that includes information of an external lighting condition 76. The light management unit 207 may include a function to automatically turn on the lighting device 60 attached on the smart walking stick 10 according to a detection result of the light sensor 52. Light sensors 52 may be associated with lights 60 affixed to the smart walking stick 10 such that the lights 60 are activated if ambient light levels are low. The lighting device 60 may comprise, for example, a light-emitting diode (LED) array for illuminating the ambient surroundings under low light levels. The system 100 helps others recognize the presence of the visually-impaired person 5 in dark conditions. Voice assistance with external lighting conditions of the system 100 can help the visually-impaired person 5 to be more cautious.

The light management unit 207 may activate the lighting device 60 in connection with camera sensors 53 under low light conditions to enable the camera sensors 53 to accurately capture image data. Additionally, the visually-impaired person 5 may be alerted to the external lighting conditions via audio, tactile and/or haptic feedback to enable the visually-impaired person 5 to exercise an abundance of caution in navigating the intended route.

Proximity sensors 54 and/or camera sensors 53 may be sensors for detecting 360 degrees around the smart walking stick 10 and the person 5 that function as a sensor configured to detect 360 degree moving objects approaching. Typical 360-degree sensors are Lidar sensors. The generation module 201 may include a scanning unit 208 that is configured to detect a moving object approaching to the person 5 that comes closer to the person 5 at every direction and to generate the auditory-haptic content 70 that includes an emergency alert instruction 77 by verbal, tactile and/or haptic feedback to the visually-impaired person 5 to avoid collision.

The set of modules 200 may include an intelligent guidance module 230 that is configured to distinguish between movable objects and immovable objects in frequently travelled paths of the person 5 to help decision making faster and generating the auditory-haptic content 70 with precise guidance. The intelligent guidance module 230 may include a machine learning module 235 configured to help understand frequently used tracks to help guide efficiently. The intelligent guidance module 230 may also be configured with intelligence to be context-aware, being able to detect and differentiate between environments such as a workplace, a home, the outdoors and so on.

Figure 3:
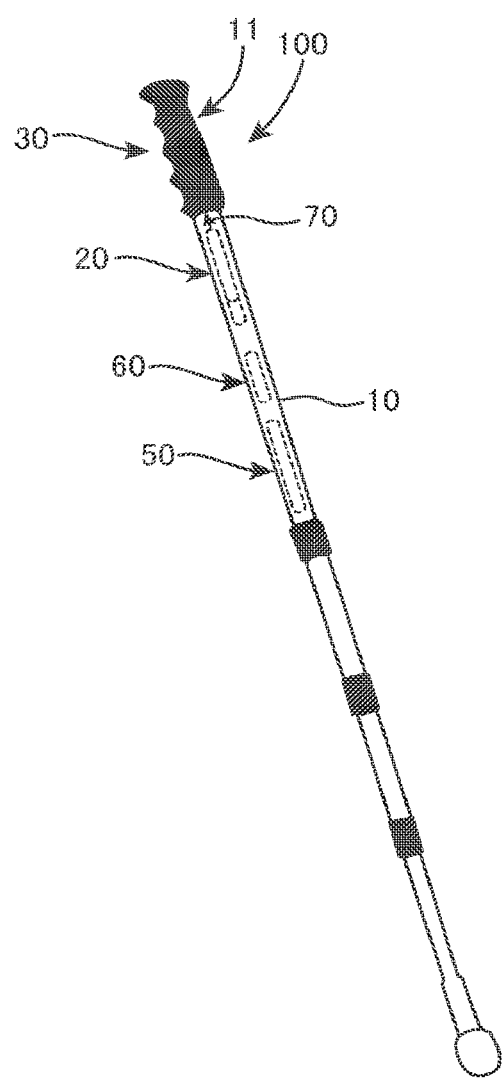
FIG. 3 is a perspective view of one embodiment of a personal navigation device in accordance with the invention.

Referring now to FIG. 3, one embodiment of a personal navigation system 100 in accordance with the invention may be fully integrated such that all features and components of the system 100 are present in a single device. As shown, the personal navigation system 100 may comprise a smart walking stick 10 having integrated sensing suite 50, the smart device 20, lighting device 60, and communication devices 30. As shown, a processing system for implementing the smart device 20 may be located near a handle 11 or proximal end of the smart walking stick 10 to protect the processing system from damage. The sensor array configuring the sensing suite 50 may communicate with the processing system of the smart device 20 via wired communication methods known to those in the art. Configuration tools of the smart device 20 may be accessed by voice commands or buttons integrated into the smart walking stick 10. In other embodiments, configuration tools of the smart device 20 may be accessed through an application on a mobile device. In yet other embodiments, configuration tools of the smart device 20 may be accessed remotely through a cloud server 300 or the like.

Communication devices 30 integrated into the smart walking stick 10 may include speakers, buzzers, piezoelectric crystals, or any other such device to provide audible and/or tactile or haptic feedback to a visually-impaired person 5. As shown, communication devices (output devices) 30 integrated into the smart walking stick 10 may receive the auditory-haptic content 70 from the smart device 20 integrated in the smart walking stick 10 via wired communication means known to those in the art.

In another embodiment of a personal navigation system 100 in accordance with the invention, the personal navigation system 100 may comprise a mobile terminal or cellular phone 27 having integrated sensing suite 50, the smart device 20, lighting device 60, and communication devices 30. In other embodiments, a personal navigation system 100 may be distributed across more than one device. For example, some functionality of the personal navigation device 100 may be contained in a smart walking stick 10 while other functionality of the personal navigation device 100 may be contained in a cellular phone 27. In some embodiments, the visually-impaired person 5 may initialize a Wi-Fi or other wireless connection between the cellular phone 27 and a local wireless network. The assistant application 28 running on the cellular phone 27 may allow the visually-impaired person 5 to initialize and customize the personal navigation device 100 according to his preferences. The wireless connection may also allow the personal navigation device 100 to stream data to a remote server (not shown) either via the cellular phone 27 or directly through the wireless connection.

Figure 4:
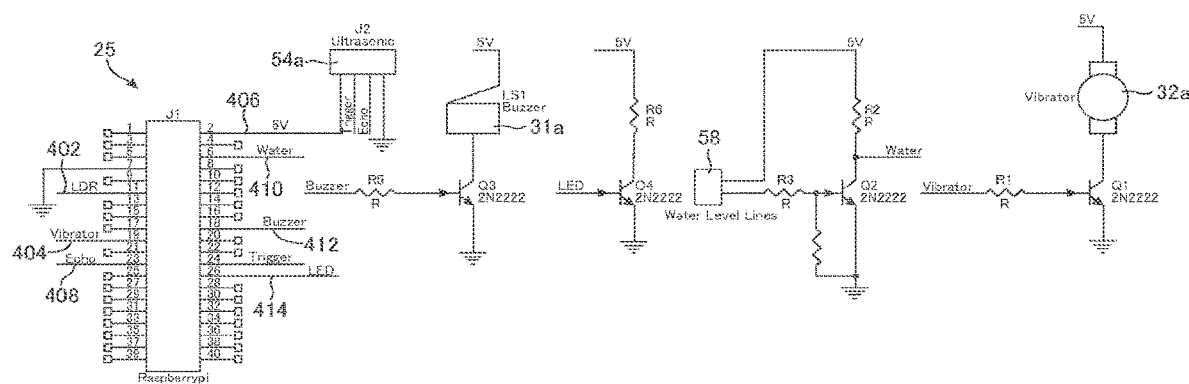
FIG. 4 is a schematic of a processor for a personal navigation system in accordance with the invention.

As previously mentioned, certain embodiments of the present invention may utilize an embedded processor 25 such as Raspberry Pi. FIG. 4 is a representative circuit diagram of one embodiment of an embedded processor 25 with certain associated components and interfaces.

As shown, one pin 402 of the embedded processor 25 may interface with a light-dependent resistor (LDR) to detect ambient light levels. Another pin 404 of the embedded processor 25 may drive a haptic feedback system or vibration circuit 32a. A pin 406 of the embedded processor 25 may drive a trigger of ultrasonic sensors 54a, while an associated echo may be received at pin 408. The output of water sensors 58 may be read at pin 410, while pin 412 may drive a buzzer 31a of the communication device 30. An LED circuit may be driven by output from pin 414.

Figure 5:
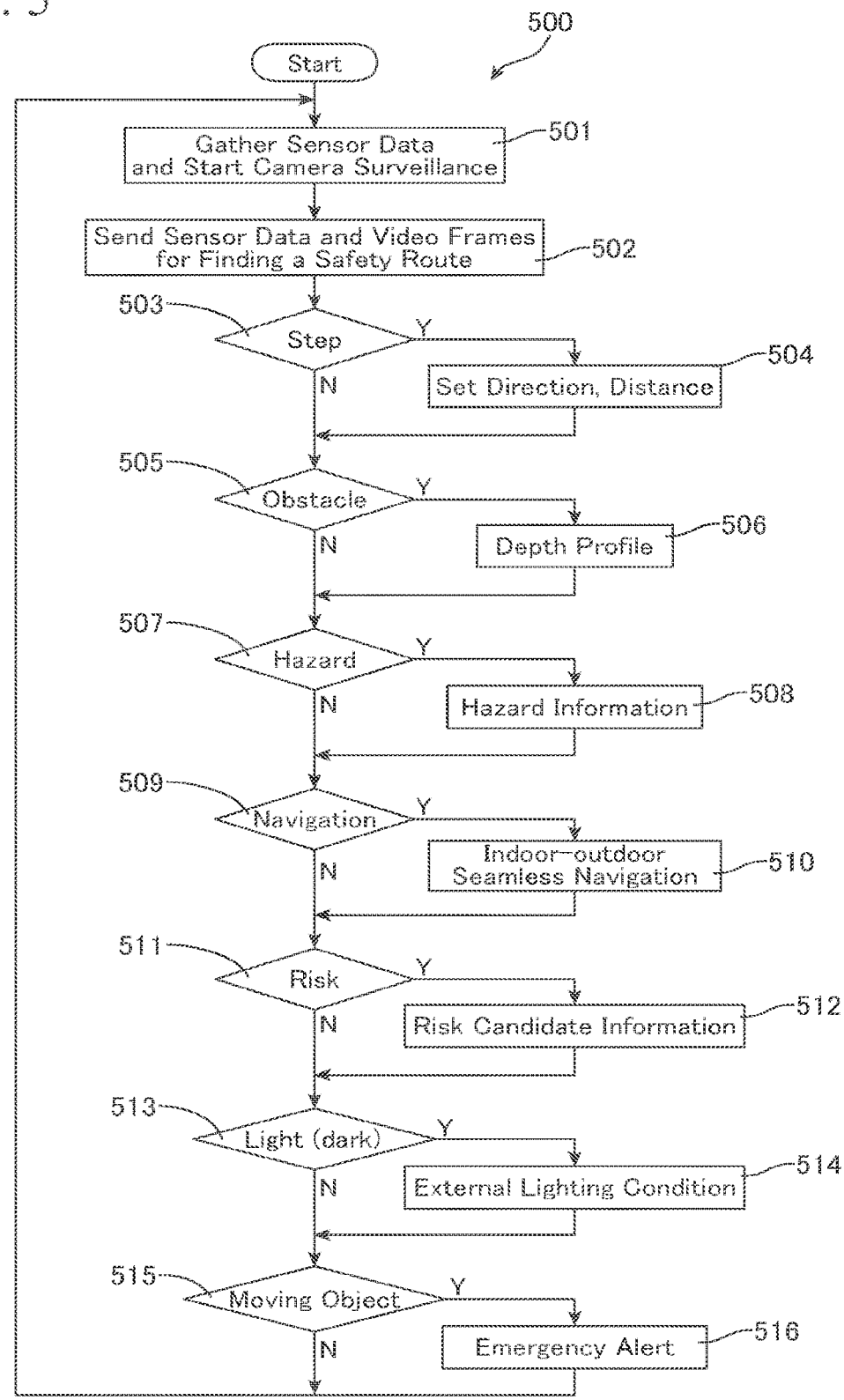
FIG. 5 is a flow chart depicting a process for assisting a visually-impaired person with navigation in accordance with certain embodiments of the invention.

FIG. 5 depicts one embodiment of a method 500 for operating a personal navigation system 100 in accordance with embodiments of the present invention. The method 500 may first determine whether the personal navigation system 100 has been started (powered on). If the system has been started, sensor data may be gathered from various sensors of the sensing suite 50, and camera surveillance may begin at step 501. Sensors may include, for example, proximity sensors (ultrasonic sensors) 54, light sensors 52, camera sensors 53, motion sensors (accelerometers and gyrometers) 55, water sensors 58, location sensors 57, and the like. Sensor data and video data from camera surveillance may be transmitted at step 502 to a processing system 25 for finding a safety route for the person 5 and for other processing by any wired or wireless transmission method known to those in the art.

A typical initialization sequence associated with the system 100 would include initializing a Wi-Fi connection between a user mobile device 27 and a local wireless network. Application software 28 running on the user mobile device 27 allows a user to initialize and customize the personal navigation system (smart visually-impaired assistant) 100 to their needs. Also, the Wi-Fi connection allows the system 100 to stream data to a remote server either via the user mobile device 27 or directly through the Wi-Fi connection.

At step 503, the step-by-step navigation unit 205 judges whether or not the person 5 has moved one step (foot). When the person 5 moves, the step-by-step navigation unit 205 notifies each unit of the generation module 201 of the movement, the direction and distance moved, and enables the generation of the content 70 that includes the step-by-step navigation information 205 to communicate it to the person 5 at step 504. When the person 5 does not move, the step-by-step navigation unit 205 can set each unit of the generation module 201 so as to provide the content 70 including information that detects a change in the surrounding environment, if necessary.

At step 505, when the exploration unit 202 judges the presence or absence of an obstacle in the moving (traveling) direction of the person 5, the exploration unit 202 makes a depth profile 71 to the direction step-by-step and generates the content 70 including alarms at step 506 to transfer the alarms to the person 5 via the communication devices 30. For example, the exploration unit 202 may detect the presence of objects in the surrounding vicinity or path of the person 5. This may be accomplished using sensor data provided by the sensing suite 50. Predetermined thresholds may define acceptable distances for detected objects. The exploration unit 202 may determine whether a distance between the visually-impaired person 5 and the detected object or obstacle is less than the predetermined threshold. If so, the exploration unit 202 may activate audio feedback by the content 70 to alert the visually-impaired person 5 to the presence of the object in sufficient time to avoid collision. If not, no audio feedback may be provided as the content 70.

At step 507, when the hazard prediction unit 203 finds the potential hazard in the traveling direction of the person 5, the hazard prediction unit 203 generates the content 70 including hazard or potential hazard information 72 at step 508. For example, the hazard prediction unit 203 that judges the water sensors 58 may detect water content on surfaces (such as ice, snow, or standing water) or suspended in the air (such as rain, fog, or humidity) in the surrounding environment of the person 5. Water sensors 58 may be utilized to measure water content levels. If water is present, the hazard prediction unit 203 may process water content levels and determine whether such levels exceed predetermined thresholds. If water content levels exceed predetermined thresholds and thus pose a danger to the visually-impaired person 5 at step 507, then at step 508, the hazard prediction unit 203 may provide haptic feedback to visually-impaired person 5 by way of a buzzer or piezoelectric crystals, for example. If the water content levels do not meet predetermined thresholds, no haptic feedback may be provided.

At step 509, when navigation from point A to B is required by the person 5, the indoor-outdoor navigation unit 204 generates the content 70 including continuous navigation information 73 between indoor and outdoor, at step 510, to advice a safety route to the person 5. At step 511, when the risk management unit 206 finds some risk candidate factors or potential risks on the ways or routes of the person 5, the risk management unit 206 generates the auditory-haptic content 70 that includes a presence of risk candidate factor 75.

At step 513, when the light management unit 206 judges that the surroundings are getting darker, the light management unit 206 generates the content 70 including an external lighting condition 76 and turns on the lighting device 60 at step 514. For example, ambient light levels may be processed by the light management unit 206 to determine whether light levels are low relative to a predetermined threshold at step 513. If so, an LED or LED array 60 may be activated as a safety mechanism to alert others to the presence of the visually-impaired person 5 at step 514. Activation of the LED array 60 at step 514 may also facilitate image and video data capture under low-light conditions. If ambient light levels meet or exceed a predetermined value, no LEDs may be activated.

At step 515, when the scanning unit 208 detects a moving object approaching to the person 5, the scanning unit 208 generates the content 70 including an emergency alarm 77 to avoid collision at step 516. Audio feedback of the content 70 may comprise, for example, verbal identification of the object, verbal identification of the distance between the visually-impaired person 5 and the object, instructions regarding navigation around the object, and/or any other pertinent information to enable the visually-impaired person 5 to avoid collision with the object. In other embodiments, audio feedback may comprise a series of sounds varying in pitch or frequency depending on the proximity of the object to the visually-impaired person 5.

Current advances in sensing and digital processing technology can be availed of to assist visually-impaired people and reduce the impact of the disability in certain areas of their life. The goal is to provide an array of sensing mechanisms (sensing suite) 50 that can provide to the user 5 a content 70 that includes comprehensive information set regarding the navigational state of the world around them. The approach presented here is to augment the functionality of the existing walking stick by integrating a comprehensive sensing system 50 with the walking stick, where the sensing system 50 is configured to provide navigational cues about the state of the world to a user 5 of the walking stick. This system 100, referred to as a Smart Visually-impaired Assistant, empowers a visually-impaired person 5 to sense the surroundings using advanced sensors that provide a sense of proximity, position, nature of obstacles in their path, etc., thus enhancing their mobility.

The technology disclosed herein may be included in other types of assistant tools as well as the walking stick (smart walking stick) 10, for personal navigation system 100, such as vests (smart vests), jackets (smart jackets), helmets (smart helmets), headgear (smart headgear), glasses (smart sunglasses), or any other smart clothing or wearable or non-wearable devices known to those in the art. Thus, although particular reference has been made herein to smart walking sticks, the technology disclosed herein is not limited to walking sticks and may in fact be embedded in other types of devices.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions, data structures and/or program (program product). Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

We claim:

1. A navigation system, comprising:
    an intelligent guidance module configured to:
        identify, using machine learning, one or more frequently travelled paths, by a user of the navigation system; and
        detect one or more objects on the one or more frequently travelled paths; and
    a generation module configured to generate auditory-haptic information to navigate the user through one of the one or more frequently travelled paths, based at least on the detected one or more objects.

2. The navigation system of claim 1, wherein the generation module is configured to generate the auditory-haptic information based at least on one or more conditions defined by one or more respective thresholds, and wherein the one or more conditions are associated with the detected one or more objects.

3. The navigation system of claim 2, wherein the one or more conditions include: a distance between the navigation system and one of the detected one or more objects, a level of light around the navigation system, a detection of water in and/or around the surroundings of the navigation system, surface variations of a surface of the one of the one or more frequently travelled paths, and the detection of one or more objects.

4. The navigation system of claim 1, wherein the intelligent guidance module is further configured to distinguish between a movable object and an immovable object in the one or more objects.

5. The navigation system of claim 1, wherein the intelligent guidance module is further configured to detect one or more moving objects approaching the navigation system from one or more directions around the navigation system.

6. The navigation system of claim 1, further comprising a communication device configured to communicate the generated auditory-haptic information to the user.

7. The navigation system of claim 1, further comprising:
a sensing suite including a light sensor for detecting ambient light around the navigation system and a camera sensor for capturing one or more images along the one of one or more frequently travelled paths; and
a lighting device,
wherein to generate the auditory-haptic information, the generation module is further configured to:
generate auditory-haptic information including a state when a level of the detected ambient light is lower than a threshold; and
automatically turn on the lighting device to facilitate image capture by the camera sensor on the one of the one or more frequently travelled paths.

8. The navigation system of claim 7, further comprising:
a light management unit configured to recognize a presence of the user based at least on the automatic turning on of the lighting device; and
a communication device configured to communicate the auditory-haptic information to the user.

9. The navigation system of claim 7, wherein one or more of the light sensor and the camera sensor are positioned near a proximal end of the navigation system.

10. The navigation system of claim 1, wherein the generation module is further configured to generate 3-dimensional (3D) depth profile information around the user, based at least on a measured distance of each of the detected one or more objects from the user.

11. The navigation system of claim 10, wherein the generation module is configured to generate the auditory-haptic information based at least on the 3D depth profile information around the user.

12. The navigation system of claim 1, wherein the generated auditory-haptic information comprises continuous navigation information between indoor and outdoor environments for navigating the user to a desired destination on the one of the one or more frequently travelled paths, and wherein the generation module is further configured to generate the continuous navigation information by including maps, generated in one or more of the indoor and outdoor environments, for navigating the user to the desired destination, in the continuous navigation information.

13. The navigation system of claim 1, wherein the generated auditory-haptic information includes step-by-step navigation information to navigate the user through the one of the one or more frequently travelled paths, and wherein the navigation system further comprises a step-by-step navigation unit configured to generate the step-by-step navigation information when the user has moved one foot in distance.

14. A smart walking stick, comprising:
one or more sensors configured to detect a moving object approaching the smart walking stick from one or more directions around the smart walking stick; and
a generation module configured to generate auditory-haptic content to navigate around the moving object based at least on the detection of the moving object.

15. The smart walking stick of claim 14, wherein the auditory-haptic content includes one or more of: verbal identification of the moving object, verbal identification of a distance between a user of the smart walking stick and the moving object, instructions regarding the navigation around the moving object, and a series of sounds varying in frequency depending at least on a proximity of the moving object to the user.

16. The smart walking stick of claim 14, further comprising an intelligent guidance module configured to identify, using machine learning, one or more frequently travelled paths, by a user of the smart walking stick, and wherein the generation module is configured to generate the auditory-haptic content further based at least on the identification of the one or more frequently travelled paths by the user.

17. A smart walking stick, comprising:
one or more sensors configured to detect a presence of one or more objects around a user of the smart walking stick; and
a generation module configured to:
generate 3-dimensional (3D) depth profile information around the user, based at least on a measured distance of each of the one or more objects from the user;
determine a safety route involving minimal interference from the one or more objects, based at least on the 3D depth profile information; and
generate audio-haptic content to indicate the determined safety route.

18. The smart walking stick of claim 17, wherein to generate the 3D depth profile information around the user, the generation module is configured to compare the measured distances with a predetermined value, and wherein the generation module is configured to determine the safety route involving minimal interference from the one or more objects based at least on the comparison of the measured distances with the predetermined value.

19. The smart walking stick of claim 17, further comprising an intelligent guidance module configured to identify, using machine learning, one or more frequently travelled paths, by the user, and wherein the generation module is configured to generate the audio-haptic content based at least on the identification of the one or more frequently travelled paths by the user.

20. The smart walking stick of claim 17, further comprising a communication device configured to communicate the generated audio-haptic content to the user.

* * * * *